(12) United States Patent
Tseng et al.

(10) Patent No.: US 6,703,604 B2
(45) Date of Patent: Mar. 9, 2004

(54) SCANNING METHOD FOR DETECTING DOCUMENTS

(75) Inventors: Jen-Shou Tseng, MiaoLi (TW); Cheng-Kuei Chen, Hsinchu (TW)

(73) Assignee: Umax Data Systems, Inc. (TW)

( * ) Notice: Subject to any disclaimer, the term of this patent is extended or adjusted under 35 U.S.C. 154(b) by 0 days.

(21) Appl. No.: 10/008,184

(22) Filed: Nov. 9, 2001

(65) Prior Publication Data

US 2003/0089840 A1 May 15, 2003

(51) Int. Cl.[7] .................................................. H01J 3/14
(52) U.S. Cl. ..................................... 250/235; 250/208.1
(58) Field of Search .............................. 250/221, 222.1, 250/208.1, 235, 234, 237 R, 226, 559.4, 559.44; 358/474, 487, 497, 482, 513, 514, 515, 516, 517, 518; 382/315, 319

(56) References Cited

U.S. PATENT DOCUMENTS

| | | | | |
|---|---|---|---|---|
| 5,814,809 A | * | 9/1998 | Han ........................ | 250/208.1 |
| 6,256,117 B1 | * | 7/2001 | Hsu et al. ................... | 358/475 |
| 6,259,540 B1 | * | 7/2001 | Hsu et al. ................... | 358/474 |
| 6,445,480 B1 | * | 9/2002 | Huang et al. ............... | 359/196 |
| 2002/0051240 A1 | * | 5/2002 | Lu et al. ..................... | 358/474 |

\* cited by examiner

Primary Examiner—Que T. Le
Assistant Examiner—Eric J Spears (57) ABSTRACT

A scanning method for detecting documents is provided an optical scanning device. The optical scanning device is capable of scanning an object by a reflective scanning mode or a transmittal scanning mode. Then obtaining an image signal of the object by either the reflective scanning mode or a transmittal scanning mode with the retrieved scanning mod. Comparing the image signal with a pre-determined signal will result in an implementation from one of the reflective scanning mode or the transmittal scanning mode.

5 Claims, 10 Drawing Sheets

SCANNING METHOD FOR DETECTING DOCUMENTS

FIELD OF THE INVENTION

The present invention relates to a scanning method for detecting documents, especially to a kind of scanning method for a scanner's detected document that can be examined as a reflection document or a transmission document.

BACKGROUND OF THE INVENTION

High technologies are progressing abruptly, especially the technology of micro-electronic processes is further changing day by day, so computer has already penetrated into every family and industry, and become an indispensable electronic product in our daily lives. Following the prevalence of computer and multi-media, it is required more peripheries as in putting and outputting devices. Since the sophisticated progress for optical and semiconductor technologies, it makes the product technology for computer relative peripheries, such as optical scanner, be increasingly improved and prevalent, and become a product of necessity for the computer's peripheries. Wherein, the optical scanner mainly applies a light source module to provide light source for scanning documents, and also applies a light-path apparatus to receive reflected image of document during scanning. The charge-coupled device retrieves document image, and the optical signal is converted into digital signal, and finally the signal is again transferred to a computer for processing an image treatment.

Figure 1:
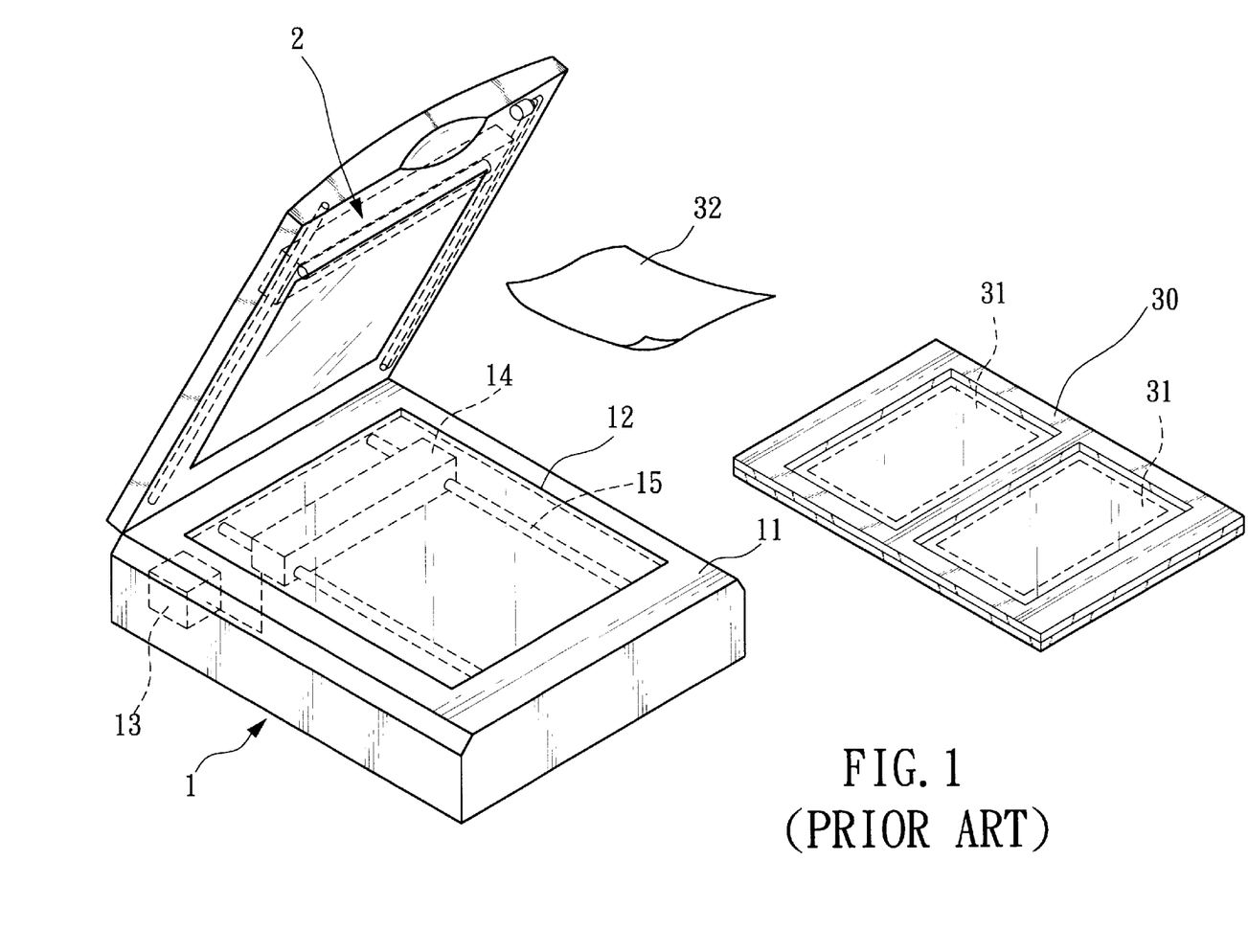
FIG. 1 is an embodiment illustration for a three-dimensional structure of a flat bed optical scanner typically seen in current market.

Please refer to FIG. 1, which is a three-dimensional structure illustration for an embodiment of a typically flat bed optical scanner seen in current market. Mainly, a document window glass 12 is arranged on the upper side surface of the outer shell 11 of a scanner 1 for supporting a reflective document 32. Through a driving apparatus 13 to drive an optical chassis 14 to move linearly along a guiding rod 15 inside the hollow outer shell 11, an image scanning job for the reflective document 32 placed on the document window glass 12 is proceeded. The document window glass 12 may also place a transparency-supporting frame 30 that is arranged with plural transmittal documents 31. An upper transparency module 2 is arranged for providing a light source to make the driving apparatus 13 drive the optical chassis 14 moving linearly along the guiding rod 15 inside the hollow outer shell 11 and proceed image scanning job for the transmittal document 31 placed on the document window glass 12.

Figure 2A:
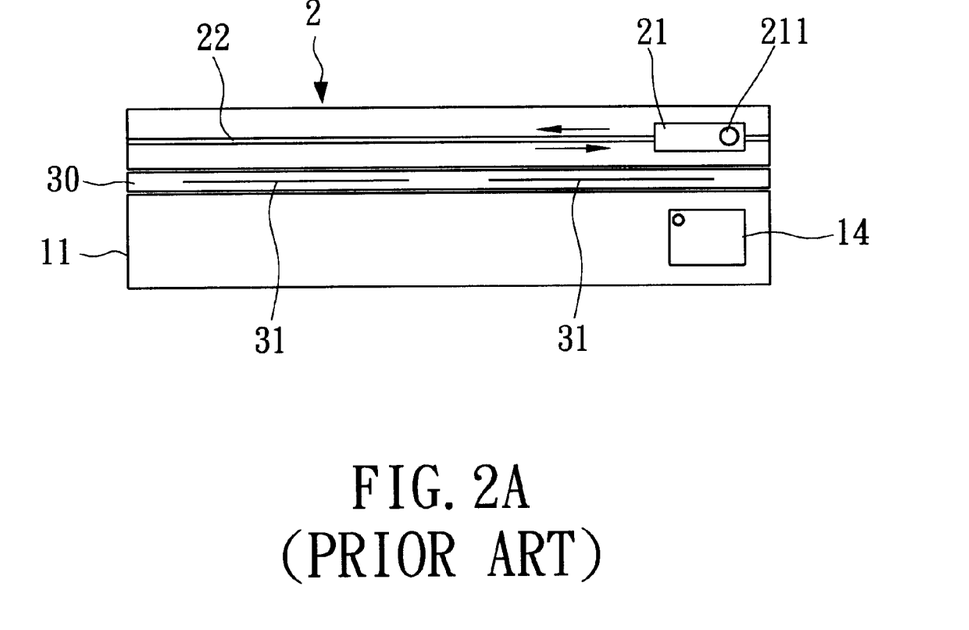
FIG. 2A is a cross-sectional structure embodiment for a flat bed optical scanner with upper transparency module of prior transmission-typed.

Please refer to FIG. 2A, which shows an illustration of cross-sectional structure for a flat bed optical scanner with upper transparency module of prior transmission type. Wherein, a transparency-supporting frame 30 is placed on the outer shell 11, and an upper transparency module 2 is arranged on the rear lid. An upper transparency assembly 21 is arranged inside the upper transparency module 2. There is a lamp 211 inside the upper transparency assembly 21. The upper transparency module 2 is arranged with at least one guiding rod 22 and the upper transparency assembly 21 is moved back and forth along the extension direction of the guiding rod 22 inside the upper transparency module 2 for matching the image scanning job for the transmittal document 31 of the optical chassis 14.

Figure 2B:
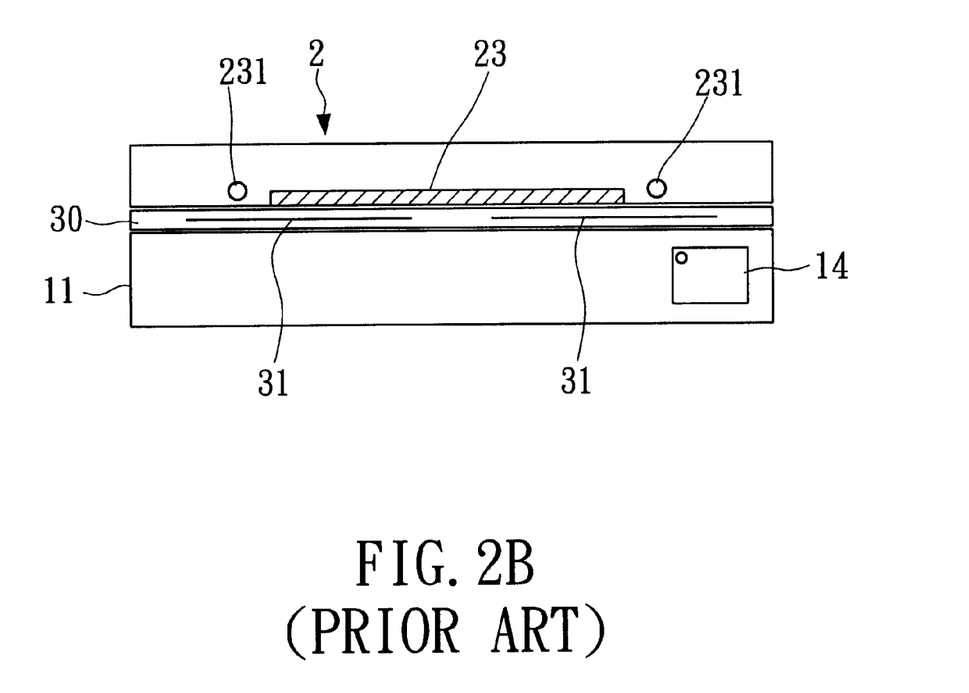
FIG. 2B is a cross-sectional structure embodiment for a flat bed optical scanner with upper transparency module of prior fixation-typed.

And, FIG. 2B is an illustration of the cross-sectional structure for a flat bed optical scanner with the upper transparency module of prior fixation type. Wherein, an upper transparency cover 23 is arranged inside the upper transparency module 2. A lamp 231 arranged on both sides provides light for the upper transparency cover 23 for matching the image scanning job for the transmittal document 31 of the optical chassis 14. From above description, in the upper transparency assembly 21, the lamp 211 and the upper transparency cover 23 provide the light source for image scanning job for the transmittal document 31.

Figure 3A:
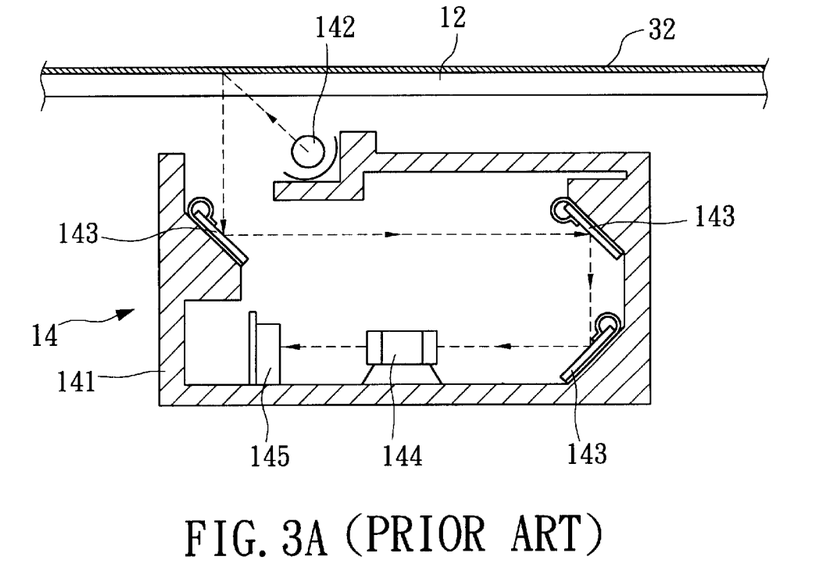
FIG. 3A is an illustration for a light progressing path for a reflective document of prior reflective scanning mode during executing a scanning job.
Figure 3B:
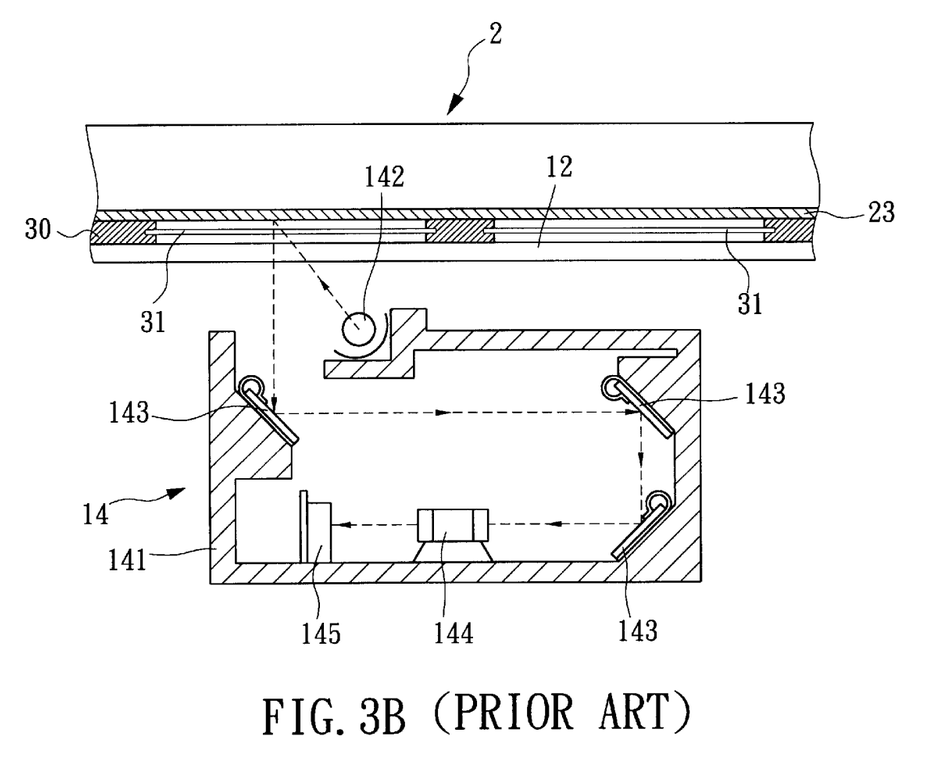
FIG. 3B is an illustration for a light progressing path for a transmittal document of prior reflective scanning mode during executing a scanning job.

Please refer to FIG. 3A, which is an illustration of light progressing path for prior reflective document in reflective scanning mode apparatus to execute scanning job. Wherein, the optical chassis 14 includes: a hollow shell body 114, a first light source 142 positioned at appropriate position on the upper side surface of the shell body 141, plural reflection mirrors 143, a lens set 144, and a charge-coupled device 145. The first light source 142 emits light to the reflective document 32 placed on the document window glass 12. The reflected light, entering into the shell body 141 of the optical chassis 14, is reflected and direction-changed by the plural reflection mirrors 143 to increase its optical length to an appropriate length. Afterwards, the reflected light is focused by the lens set 144 and imaged onto the charge-coupled device 145 that converts the scanned image data into electronic signals. FIG. 3B is an illustration of light progressing path for transmittal document in prior reflective scanning mode apparatus to execute scanning job. Wherein, after the light emits from the first light source 142 and is incident onto the transmittal document 31 placed on the transparency-supporting frame 30, the light will penetrate through the transmittal document 31 and be incident onto the upper transparency cover or a bottom surface (not shown in the drawings) of the upper transparency module 2. So, the image formed on the charge-coupled device 145 is the image of the upper transparency cover 23 or the bottom surface.

Figure 4A:
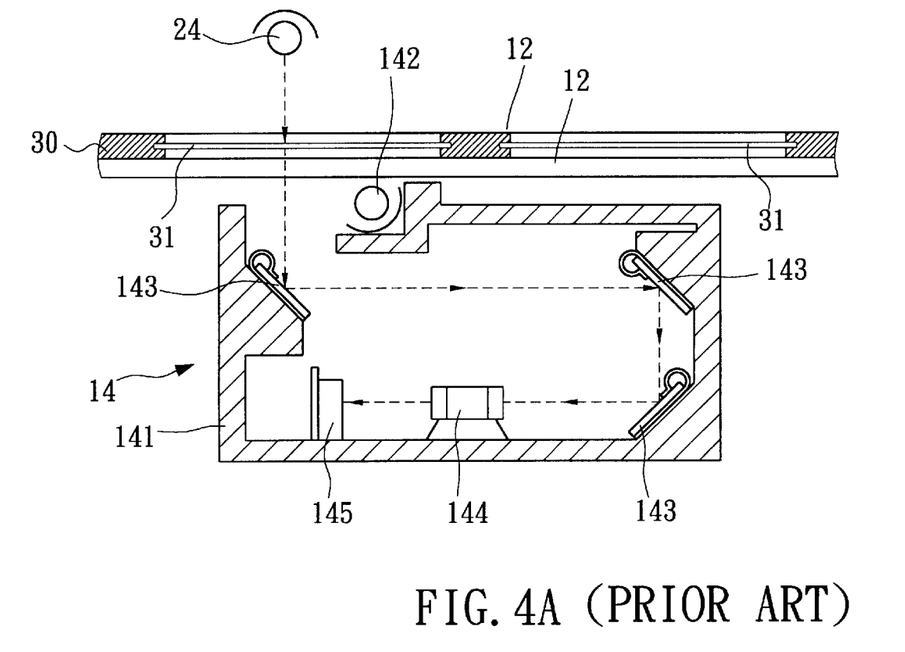
FIG. 4A is an illustration for a light progressing path for a transmittal document of prior transmittal scanning mode during executing a scanning job.
Figure 4B:
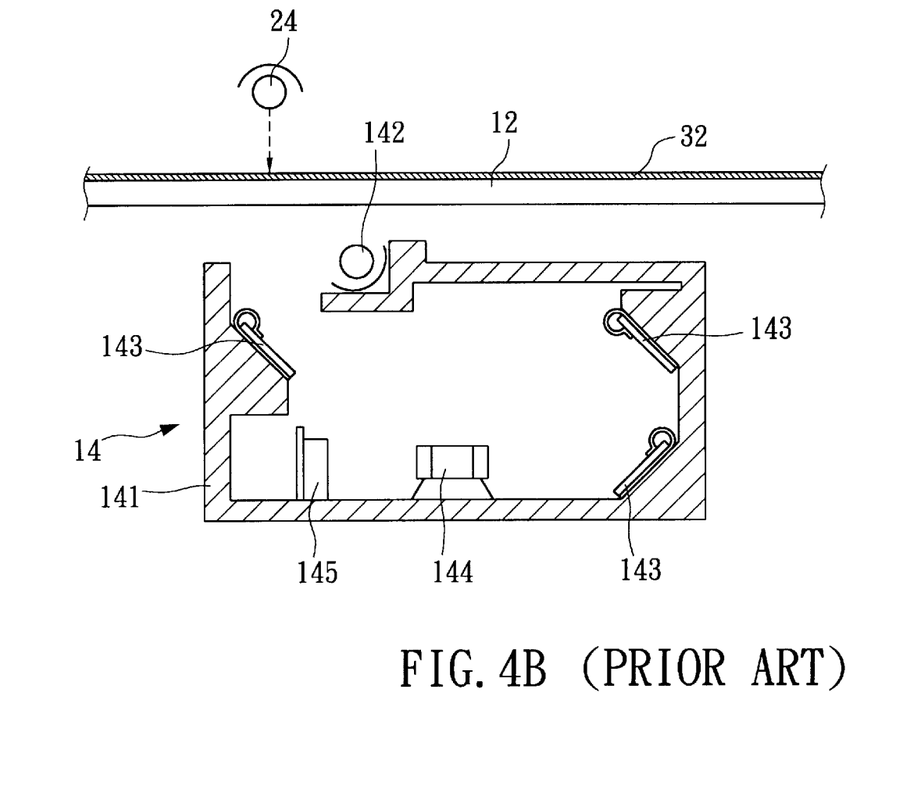
FIG. 4B is an illustration for a light progressing path for a reflective document of prior transmittal scanning mode during executing a scanning job.

Please refer to FIG. 4A, which is an illustration of light progressing path for transmittal document in prior transmittal scanning mode to execute scanning job. Wherein, after the light emits from the second light source 24 (as described in FIG. 4A and FIG. 4B) and is incident onto the transmittal document 31 placed on the transparency-supporting frame 30, the light will penetrate through the transmittal document 31 and enter into the shell body 141 of the optical chassis 14, the light will be reflected and direction-changed by the plural reflection mirrors 143. Finally, the lens set 144 will focus the reflected light into image formed on the charge-coupled device 145. And, the charge-coupled device 145 will convert the scanned image data into electronic signals. FIG. 4B, which is an illustration of light progressing path for reflective document in prior transmittal scanning mode to execute scanning job. The light from the second light source 24 is incident on the reflective document 32 placed on the document window glass 12. Since the reflective document 32 blocks the progressing of light emitting from the second light source 24, so the images formed on the charge-coupled device 145 are all patterns of dark color.

In summary of above description, it is impossible to detect and select a scanning mode appropriately during executing a scanning job on an applied document, so a scanned output frequently dose not fulfill our requirements because of executing a wrong scanning mode. Therefore, it is required an operation personnel standing by to switch an appropriate scanning mode. This wastes lots of human labor and material means because of mistaken scanning. So, the solution of this problem is urgently required by the industry and relative enterprise of scanner making.

SUMMARY OF THE INVENTION

The main object of the present invention is to provide a scanning method for detecting documents. The scanning method may provide automatic detection on scanned object to decide it belonging to reflective document or transmittal document for executing a scanning job with switching accurate scanning mode and insuring the user to operate the scanner conveniently.

To fulfill above-described object, a scanning method for detecting documents is comprised of following steps:

Step A: providing an optical scanning device, capable of a reflective scanning mode or a transmittal scanning mode to proceed scanning job on a scanned object.

Step B: selecting one scanning mode and retrieving an image signal generated by applying the scanning mode on the scanned object.

Step C: comparing the image signal with a pre-determined signal.

Step D: comparing the results and selecting one of the reflective scanning mode or the transmittal scanning mode.

Another preferable embodiment for the scanning method for detecting documents of the present invention may also include follow steps of execution:

Step A': providing an optical scanning device, which provides a first light source emitting light onto a reflective document and into an optical chassis for executing an scanning mode of reflective document, and provides a second light source of an upper transparency module emitting light onto a transmittal document and into an optical chassis for executing an scanning mode of transmittal document, and the upper transparency module is arranged with a colored pattern at an appropriate position corresponding to the optical chassis.

Step B': switching on the first light source.

Step C': the optical chassis receives the image signal of the reflected and direction-changed light from the first light source.

Step D': when the image signal is unable to retrieve the light signal of colored pattern, the scanning mode of reflective document is then executed; when the image signal is able to retrieve the light signal of colored pattern, the first light source is then closed.

Further preferable embodiment for the scanning method for detecting documents of the present invention includes follow steps of execution:

Step A": providing an optical scanning device, which provides a first light source emitting light onto a reflective document and into an optical chassis for executing an scanning mode of reflective document, and provides a second light source of an upper transparency module emitting light onto a transmittal document and into an optical chassis for executing an scanning mode of transmittal document.

Step B": switching on the second light source.

Step C": the optical chassis receive the image signal from the second light source.

Step D": if the image signal is a non-light-blocking signal, then executing the scanning mode of transmittal document; if the image signal is a light-blocking signal, then closing the second light source.

For your esteemed reviewing committee to further understand and recognize the present invention, a detailed description in matching with corresponding drawings are presented as following.

DETAILED DESCRIPTION OF THE PREFERRED EMBODIMENT

The main characteristic of the scanning method for detecting documents of the present invention is that a colored pattern is arranged in the upper transparency module. To select a scanning mode, the scanned image result retrieved by the optical chassis is judged as a corrected scanning mode or not.

Figure 5A:
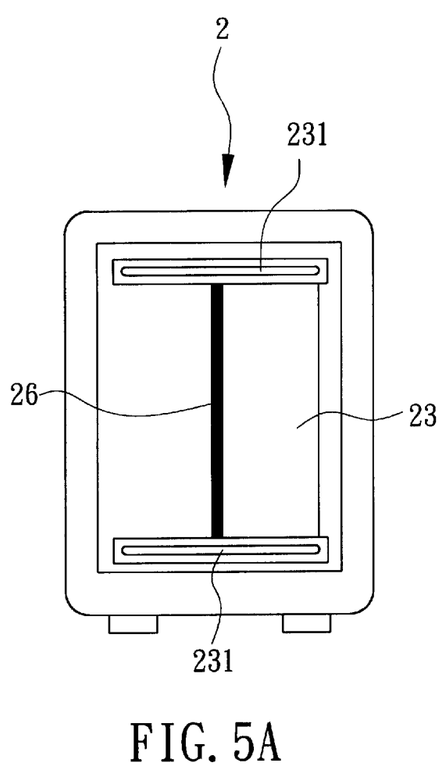
FIG. 5A is a plane illustration for the first preferable embodiment for the structure of an upper transparency module of the present invention.
Figure 5B:
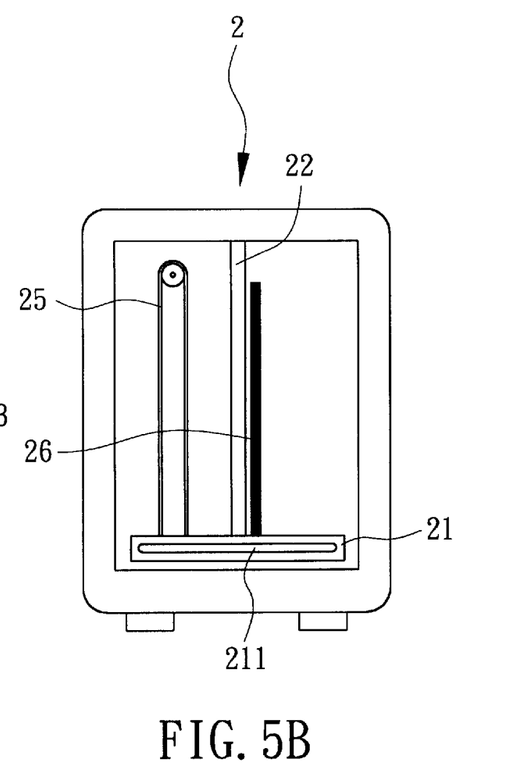
FIG. 5B is a plane illustration for the second preferable embodiment for the structure of an upper transparency module of the present invention.

Please refer to FIG. 5A and FIG. 5B, which are plane illustrations for the preferable embodiments for the structure of an upper transparency module of the present invention. Wherein a secured upper transparency cover 23 is arranged in the upper transparency module 2. The lamps 231 that are arranged in two sides provide light for the upper transparency cover 23. A colored pattern 26 of dark color is arranged at an appropriate position of the upper transparency module 2, by the manners of adhering, printing or laser labeling, etc. Preferably, the colored pattern 26 is positioned in the middle of the upper transparency cover 23. Of course, the colored pattern may also be positioned at two sides or other positions. In another preferable embodiment, the upper transparency module 2 is arranged with a upper transparency assembly 21, which has a lamp 211. The upper transparency module 2 is arranged with at least one guiding rod 22. The upper transparency assembly 21 is moved back and forth along the extension direction of the guiding rod 22 inside the upper transparency module 2. Of course, in the embodiment, a colored pattern 26 may also be arranged at appropriate position in the upper transparency module 2. Preferably, the colored pattern 26 is positioned in the middle of the upper transparency cover 23. Of course, the colored pattern may also be positioned at two sides or other positions. Since the guiding rod 22 and the belt 25 are sufficient to provide retrieval of image distinction of different color during scanning, so the set-up of the colored pattern 26 may also be the guiding rod 22 or the belt 25.

Figure 6A:
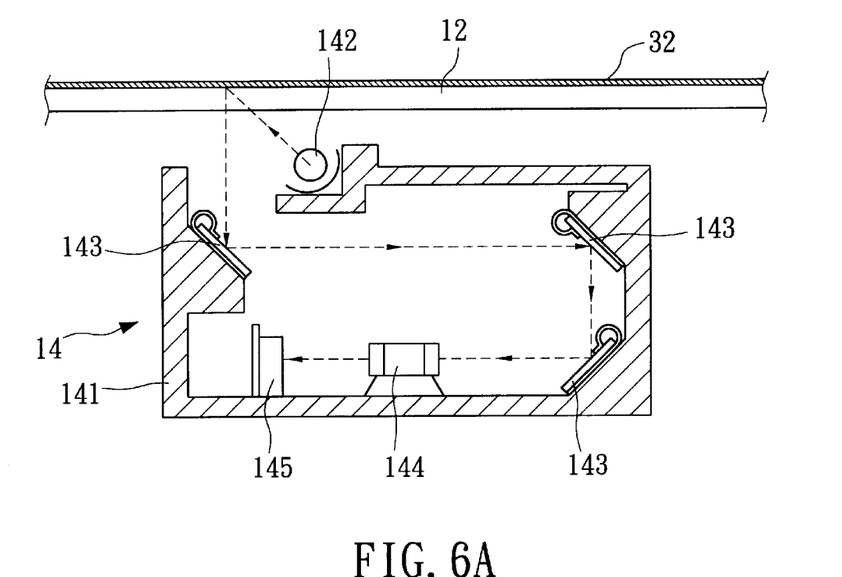
FIG. 6A is an illustration for a light progressing path for a reflective document of the reflective scanning mode of the present invention during executing a scanning job.
Figure 6B:
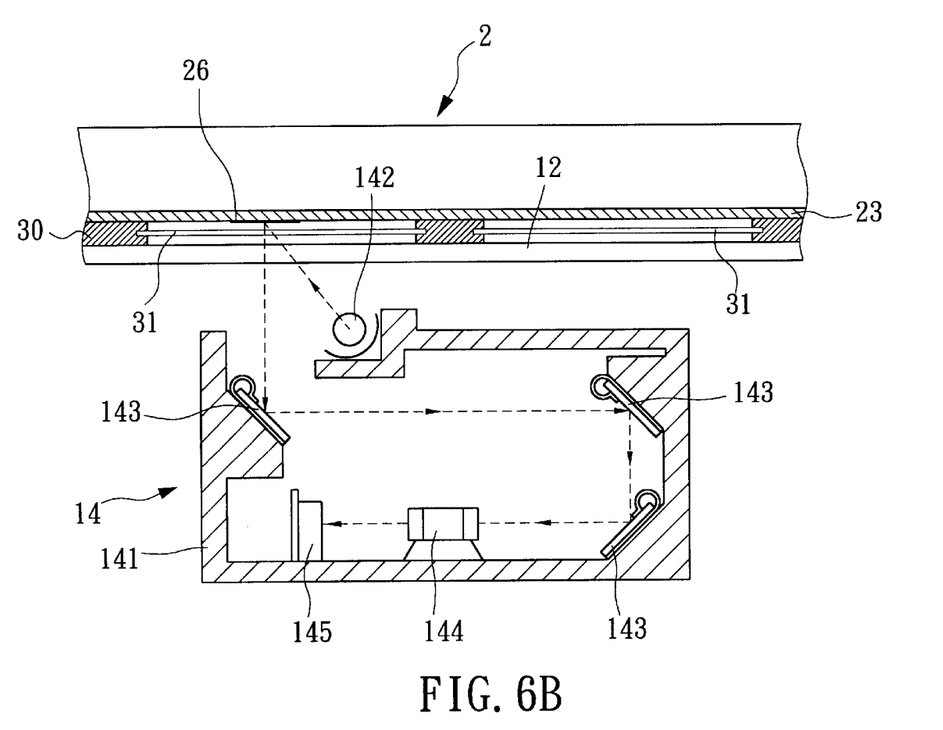
FIG. 6B is an illustration for a light progressing path for a transmittal document of the reflective scanning mode of the present invention during executing a scanning job.

Please refer to FIG. 6A, which is an illustration for a light progressing path for a reflective document of the reflective scanning mode of the present invention during executing a scanning job. Wherein, the optical chassis 14 includes: a hollow shell body 114, a first light source 142 positioned at appropriate position on the upper side surface of the shell body 141, plural reflection mirrors 143, a lens set 144, and a charge-coupled device 145. The first light source 142 emits light to the reflective document 32 on the document window glass 12. The reflected light, entering into the shell body 141 of the optical chassis 14, is reflected and direction-changed by the plural reflection mirrors 143 to increase its optical length to an appropriate length. Afterwards, the reflected light is focused by the lens set 144 and imaged onto the charge-coupled device 145 that converts the scanned image data into electronic signals. FIG. 6B is an illustration of light progressing path for the transmittal document in the reflective scanning mode of the present invention during executing a scanning job. Wherein, after the light emits from the first light source 142 and is incident onto the transmittal document 31 placed on the transparency-supporting frame 30, the light will penetrate through the transmittal document 31 and be incident onto the colored pattern 26 of the upper transparency module 2. So, the image formed on the charge-coupled device 145 is the image of the colored pattern 26.

Figure 7A:
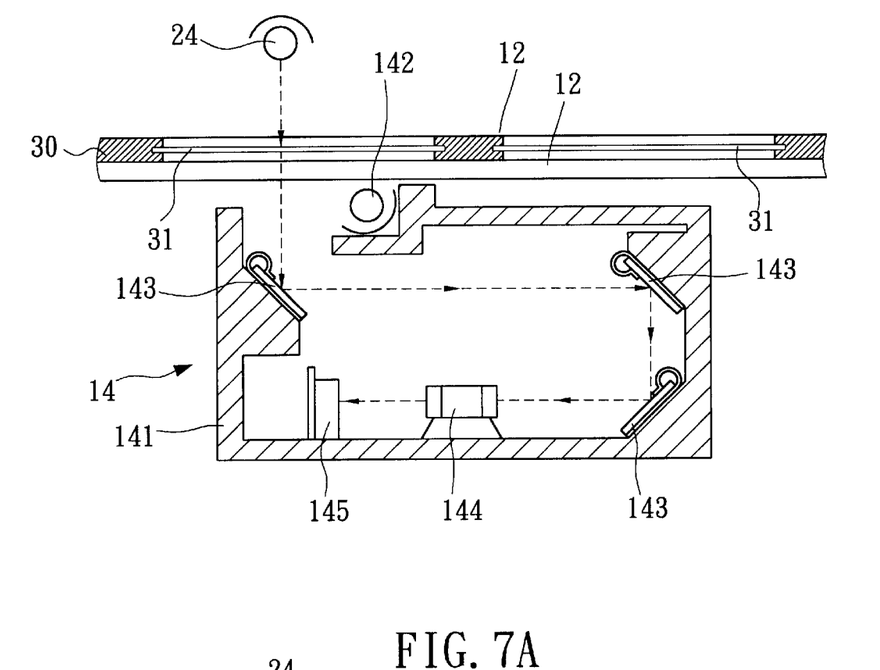
FIG. 7A is an illustration for a light progressing path for a transmittal document of the transmittal scanning mode of the present invention during executing a scanning job.
Figure 7B:
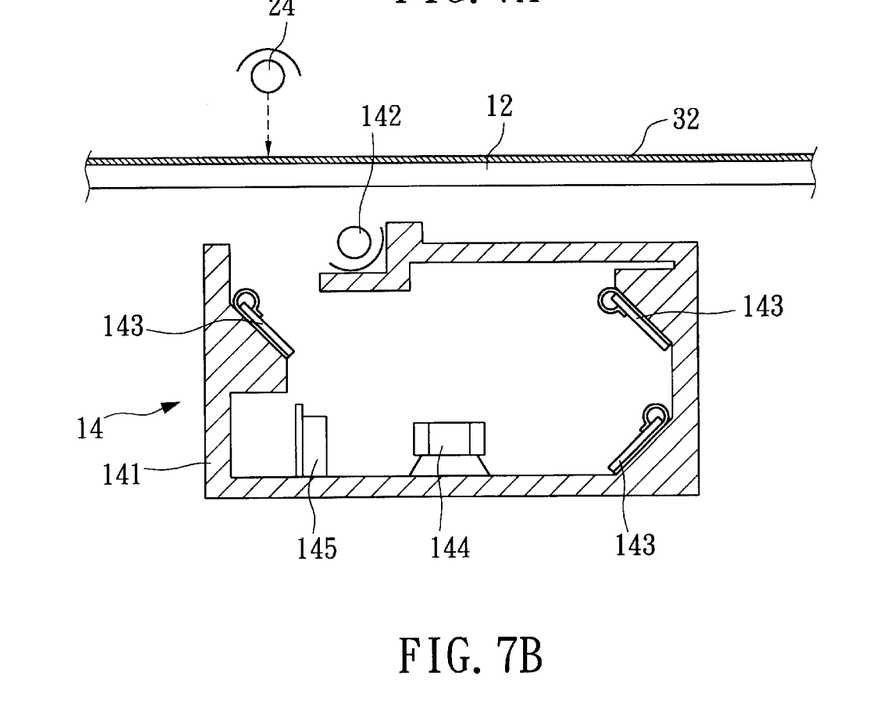
FIG. 7B is an illustration for a light progressing path for a reflective document of the transmittal scanning mode during executing a scanning job.

Please refer to FIG. 7A, which is an illustration of light progressing path for transmittal document in the transmittal scanning mode of the present invention during executing a scanning job. Wherein, after the light emits from the second light source 24 and is incident onto the transmittal document 31 placed on the transparency-supporting frame 30, the light will penetrate through the transmittal document 31 and enter into the shell body 141 of the optical chassis 14, the light will be reflected and direction-changed by the plural reflection mirrors 143. Finally, the lens set 144 will focus the reflected light into image formed on the charge-coupled device 145. And, the charge-coupled device 145 will convert the scanned image data into electronic signals. FIG. 7B, which is an illustration of light progressing path for reflective document in the transmittal scanning mode of the present invention during executing a scanning job. The light from the second light source 24 is incident on the reflective document 32 placed on the document window glass 12. Since the reflective document 32 blocks the progressing of light emitting from the second light source 24, so the images formed on the charge-coupled device 145 are all patterns of dark color.

Figure 8A:
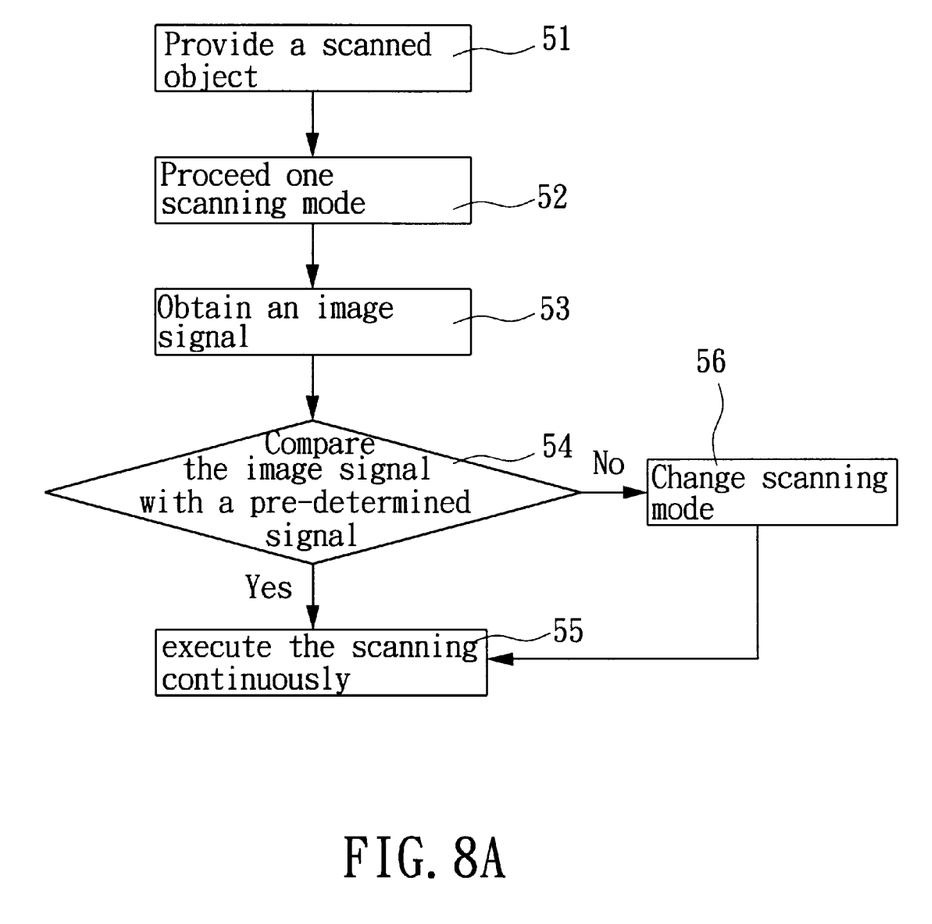
FIG. 8A is a step flow-diagram illustration for the first embodiment of the scanning method for detecting documents of the present invention.
Figure 8B:
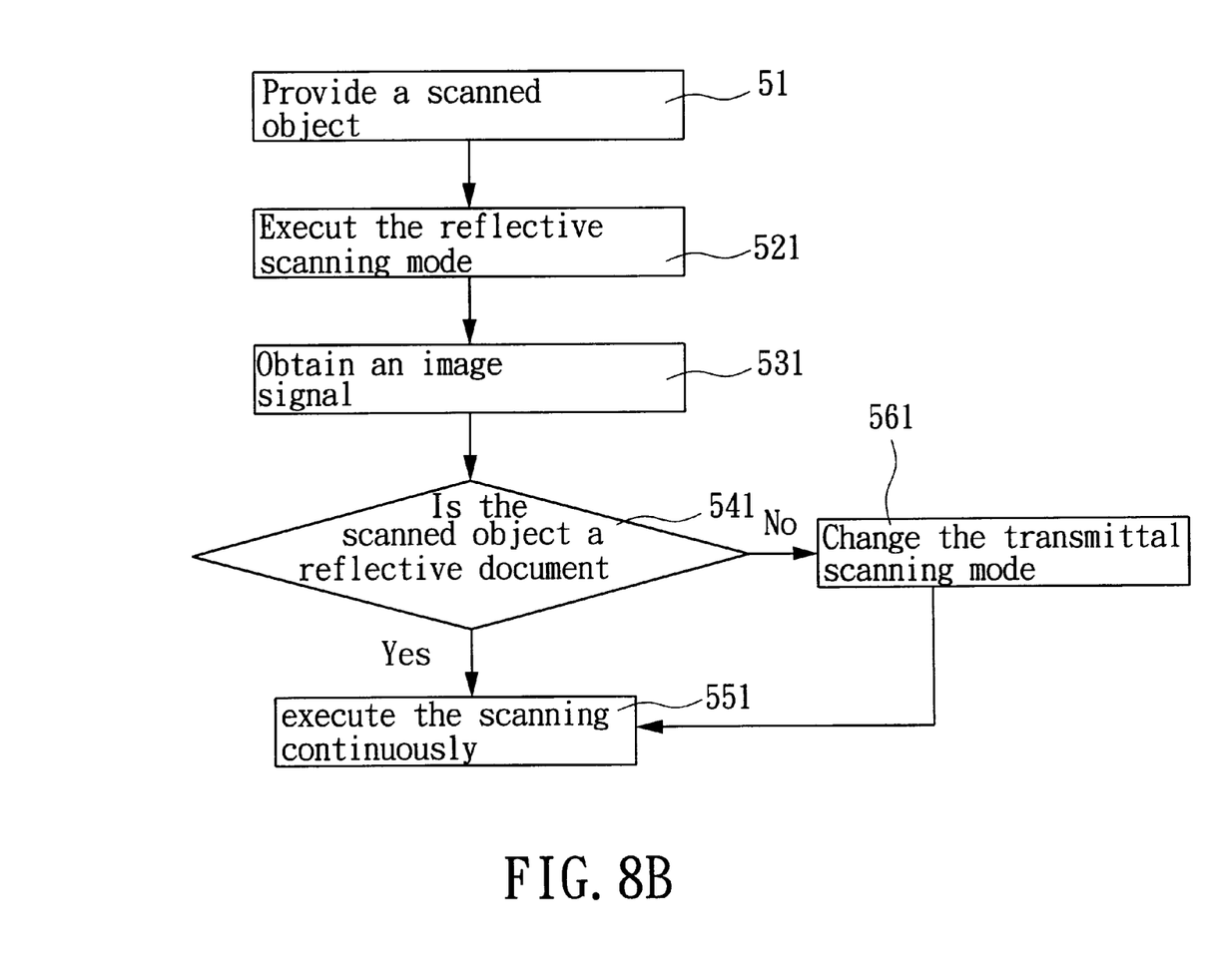
FIG. 8B is a step flow-diagram illustration for the second embodiment of the scanning method for detecting documents of the present invention.
Figure 8C:
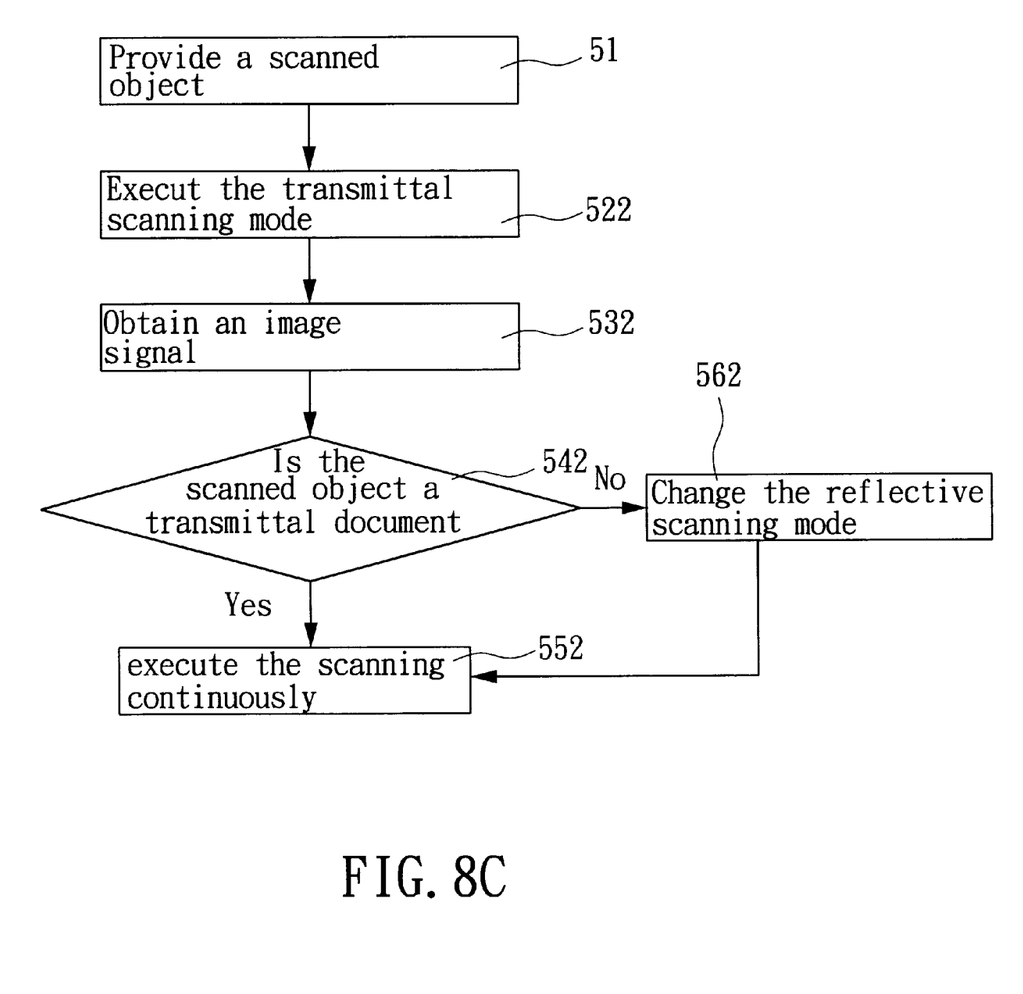
FIG. 8C is a step flow-diagram illustration for the third embodiment of the scanning method for detecting documents of the present invention.

FIG. 8A to FIG. 8C are the step flow-diagram illustrations for the embodiments of the scanning method for detecting documents of the present invention. Wherein, the scanning method for detecting documents is comprised of following steps:

Step A: providing an optical scanning device, capable of selectively a reflective scanning mode or a transmittal scanning mode to proceed scanning job on a scanned object 51, and the scanned object 51 is a reflective document or a transmittal document.

Wherein the reflective scanning mode is to provide a light emitting from a first light source onto the scanned object and an optical chassis retrieves an image of scanned object. The transmittal scanning mode is to provide a light emitting from a second light source positioned at an upper transparency module onto the scanned object and an optical chassis retrieves an image of scanned object. A colored pattern of dark color is arranged at an appropriate position in the upper transparency module with the manners of pasting, printing or laser labeling, etc. Of course, the set-up of the colored pattern may be a guiding rod or a belt.

Step B: obtaining an image signal 53 of the object by either the reflective scanning mode or a transmittal scanning mode 52. When executing the reflective scanning mode 521, first switching on the first light source, then the light emits to the scanned object. The image signal of the scanned object is one of the retrievable light signal of colored pattern or the non-retrievable light signal of colored pattern 531. Then, the image signal is converted into an electronic signal treatable by the computer software.

When executing the transmittal scanning mode 522, first switching on the second light source, then the light emits to the scanned object. The image signal of the scanned object is one dark color image of the light-blocking image signal or the non-light-blocking signal 532. Then, the image signal is converted into an electronic signal treatable by the computer software.

Step C: comparing the image signal with a pre-determined signal 54, wherein the pre-determined signal is a retrieved light signal of colored pattern and a light-blocking image signal of dark-colored image. When executing the reflective scanning mode 521, the image signal is compared with the light signal of colored pattern in the pre-determined signal 541. When executing the transmittal scanning mode 522, the image signal is compared with the light-blocking image signal in the pre-determined signal 542.

Step D: comparing the results and selecting one of the reflective scanning mode or the transmission-typed mode, i.e. executing the scanning continuously 55 or changing scanning mode 56.

When executing the reflective scanning mode 521, if the compared result is that the image signal is unable to retrieve the light signal of colored pattern, then the reflective scanning mode is executed 551. When the image signal is a retrieved light signal of colored pattern, the first light source is closed and the transmittal scanning mode is executed 561, i.e. the second light source is switched on and the light emits to the scanned object to execute the transmittal scanning mode.

When executing the transmittal scanning mode 522, if the compared result is that the image signal is a non-light-blocking image signal, then the transmittal scanning mode is executed 552. When the image signal is a light-blocking image signal of dark-colored image, the second light source is closed and the reflective scanning mode is executed 562, i.e. the first light source is switched on and the light emits to the scanned object to execute the transmittal scanning mode.

What is claimed is:

1. A method for distinguishing an object to be scanned as either a transmittal object or a reflective object, comprising:
   a. providing a scanner that is capable of reflective scanning and transmittal scanning, the scanner having an upper transparency cover with a color pattern positioned in the upper transparency cover and in the path of the transmission of an emitted light;
   b. emitting a light towards the object to be scanned; and
   c. changing the scanning mode from transmittal scanning to reflective scanning if the emitted light is blocked by the color pattern.

2. The method of claim 1:
   wherein step (b) includes obtaining an image signal based on the emitted light; and
   wherein step (c) includes comparing the image signal with a pre-determined signal.

3. The method of claim 1, wherein the color pattern is a dark color pattern that blocks transmission of light therethrough.

4. A method for distinguishing an object to be scanned as either a transmittal object or a reflective object, comprising:
   a. providing a scanner that is capable of reflective scanning and transmittal scanning, the scanner having an upper transparency cover with a color pattern positioned in the upper transparency cover and in the path of the transmission of an emitted light;
   b. obtaining an image signal by emitting a light towards the object to be scanned and reflecting the emitted light to a receiver; and
   c. changing the scanning mode from reflective scanning to transmittal scanning if the image signal represents an image of the color pattern.

5. The method of claim 4, wherein step (c) includes comparing the image signal with a pre-determined signal.

* * * * *